United States Patent [19]
DePaoli

[11] Patent Number: 5,839,529
[45] Date of Patent: Nov. 24, 1998

[54] ELECTRICALLY POWERED DRIVE TRAIN AND VEHICLE

[76] Inventor: Michael T. DePaoli, 6980 East Sahuaro #2059, Scottsdale, Ariz. 85254

[21] Appl. No.: 674,427

[22] Filed: Jul. 2, 1996

[51] Int. Cl.[6] ..................................................... B60K 1/00
[52] U.S. Cl. .......................... 180/65.1; 180/65.6; 74/477
[58] Field of Search ................................. 180/65.6, 65.3, 180/65.1, 65.2; 74/477

[56] References Cited

U.S. PATENT DOCUMENTS

| | | | |
|---|---|---|---|
| 792,974 | 6/1905 | Douglas | 180/165 |
| 3,534,825 | 10/1970 | Reffle | 180/42 |
| 3,635,301 | 1/1972 | Tuson . | |
| 3,664,450 | 5/1972 | Udden et al. . | |
| 3,773,131 | 11/1973 | Jaulmes . | |
| 3,854,368 | 12/1974 | Elco | 180/165 |
| 3,866,703 | 2/1975 | Eastham . | |
| 4,042,054 | 8/1977 | Ward . | |
| 4,042,055 | 8/1977 | Ward . | |
| 4,130,172 | 12/1978 | Moody . | |
| 4,216,839 | 8/1980 | Gould et al. . | |
| 4,222,450 | 9/1980 | Fobbs | 180/65 D |
| 4,406,342 | 9/1983 | Lacroix . | |
| 4,527,648 | 7/1985 | Sines et al. . | |
| 4,877,102 | 10/1989 | Stewart . | |
| 4,913,258 | 4/1990 | Sakurai et al. . | |
| 5,036,934 | 8/1991 | Nishina et al. . | |
| 5,172,786 | 12/1992 | Ishibashi et al. . | |
| 5,343,974 | 9/1994 | Rabek . | |
| 5,396,968 | 3/1995 | Hasebe et al. . | |
| 5,743,348 | 4/1998 | Coppola et al. | 180/65.6 |

*Primary Examiner*—Brian L. Johnson
*Assistant Examiner*—Bridget Avery
*Attorney, Agent, or Firm*—Parsons & Goltry; Robert A. Parsons; Michael W. Goltry

[57] ABSTRACT

An electric powered drive train for providing motive force to a vehicle. The drive train includes an electric motor, an engine wheel having a central axis of rotation, an outer edge and a diameter, and a driver gear driven by the electric motor and engaging the outer edge of the engine wheel for driving the engine wheel. The driver gear has a diameter which is smaller than the diameter of the engine wheel. Also included is a crank shaft coupled to and extending from the central axis of rotation of the engine wheel, the crank shaft having a diameter smaller than the diameter of the engine wheel, and a portable power source coupled to the electric motor.

9 Claims, 2 Drawing Sheets

ELECTRICALLY POWERED DRIVE TRAIN AND VEHICLE

FIELD OF THE INVENTION

This invention relates to powered vehicles.

More particularly, the present invention relates to electrically powered vehicles.

In a further and more specific aspect, the instant invention concerns vehicles powered by an electrically powered drive train.

BACKGROUND OF THE INVENTION

The population of the world is expanding at an incredible rate. As the population increases and the standards of living increase, the number of personal vehicles increases. The huge number of people driving fuel burning vehicles is putting large stresses on the environment. As the population continues to increase, the stresses on the environment also increase. A need for an alternative to internal combustion engines is becoming urgent.

The two main reasons for developing alternative motive devices are environmental and economical concerns. Fossil fuels are a limited resource which are being consumed in awesome proportions. A large quantity is consumed as petroleum which is refined from crude oil and employed in vehicles having internal combustion engines. As the reserves of oil are continually depleted, it can be envisioned that the price of gasoline will continue to rise. In terms of the environment, the United States and other countries are becoming increasingly concerned with air quality, continually developing and passing legislation requiring cleaner and more efficient vehicles.

Currently, automobiles are getting far superior gas mileage than in the past. They burn less fuel with greater cleanliness. Other devices for controlling and reducing the emissions are also being employed, such as the catalytic converter. While these each contribute to reducing the emissions from vehicles, the rate at which the number of vehicles is increasing and the additional miles internal combustion vehicles are driven far outweigh the gains made in reduced consumption and reduced emissions to date. Furthermore, these do not curtail the depletion of the world's reserves of crude oil.

Attempts are being made to develop self-contained vehicles powered by electricity. To date, the main trouble with electric vehicles has been their range. Electric motors are extremely efficient, fast, and can be powerful. For example, certain systems of public transportation run exclusively on electric motors. Unfortunately, if an electric motor is designed to do a considerable amount of work, there must also be a considerable amount of electricity constantly supplied. In the case of public transportation, charged rails or overhead wires for busses and trains supply ample electricity. However, in personal vehicles such as automobiles which do not run on pre-determined schedules, it would be impractical and next to impossible to construct a system today from which individual vehicles could draw power.

To provide for individual or personal use, electric vehicles are driven by electric motors powered by rechargeable battery packs. The use of electrical power eliminates all emissions from the vehicle, and may eliminate all use of fossil fuels depending upon the origin of the electricity. Electric automobiles have typically been developed in two basic designs. In one type, the electric motor replaces an internal combustion engine and is coupled directly to a drive shaft. In the other type, electric motors again replace the internal combustion engine, but are positioned proximate and in direct engagement with the wheels of the vehicle. Both designs result in electric vehicles having limited range and limited acceleration due to the fact that portable electric power sources do not provide enough electricity for an electric motor to be used in the same manner as an internal combustion engine. Electric vehicles for personal use such as automobiles have not been successfully developed due to their limited range and high cost. This has traditionally been blamed on poor storage technology, namely batteries.

Current manufacturers of electric automobiles are attempting to solve the above-mentioned problems in two manners. First, they have begun a search for better batteries. The new batteries being developed are currently too expensive to mass produce or do not significantly increase the available power found in conventional lead acid batteries. Second, electric vehicle manufacturers are attempting to develop improved electric motors. Instead of using direct current motors, manufacturers are attempting to employ alternating current motors. Motors powered by alternating current are more efficient than motors running on direct current. Thus, for example, a direct current motor might be 75% efficient, while an alternating current motor might be 90% efficient. The trouble with AC motors is that batteries produce DC current. The DC current must be transformed into AC current. In electric vehicles running on AC motors, the AC transformer and the controller are quite large. In current production models, the sophisticated electronics involved in these AC motors are only able to produce a maximum range of about ninety miles, despite the use of advanced nickel metal hydride batteries.

It would be highly advantageous, therefore, to remedy the foregoing and other deficiencies inherent in the prior art.

Accordingly, it is an object of the present invention to provide a new and improved electric drive train and vehicle Another object of the invention is to provide an electrically powered drive train which requires no transmission.

And another object of the invention is to provide an electrically powered drive train which amplifies the force generated by an electric motor.

Still another object of the present invention is to provide a more efficient electric vehicle.

Yet another object of the invention is to provide an electric vehicle which has extended range.

SUMMARY OF THE INVENTION

Briefly, to achieve the desired objects of the instant invention in accordance with a preferred embodiment thereof, provided is an electric powered drive train for providing motive force to a vehicle. The drive train includes an electric motor, an engine wheel having a central axis of rotation, an outer edge and a diameter, and a driver gear driven by the electric motor and engaging the outer edge of the engine wheel for driving the engine wheel. The driver gear has a diameter which is smaller than the diameter of the engine wheel. Also included is a crank shaft coupled to and extending from the central axis of rotation of the engine wheel, the crank shaft having a diameter smaller than the diameter of the engine wheel, and a portable power source coupled to the electric motor.

Also provided is a vehicle having a body carrying motive means for moving the body and the drive train as discussed above.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
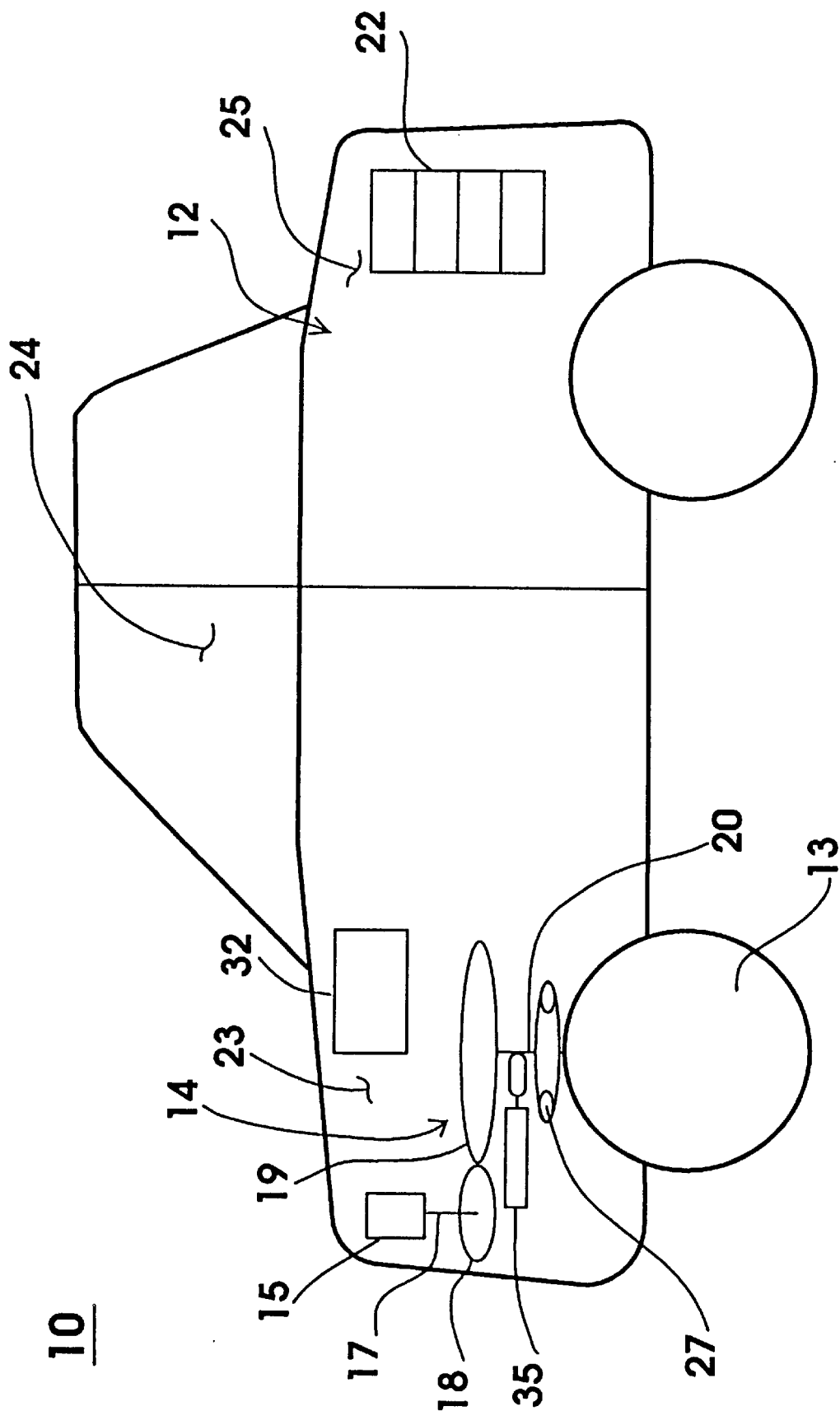
FIG. 1 is a simplified schematic view of an electric vehicle employing the drive train of FIG. 1.

Turning now to the drawings in which like reference characters indicate corresponding elements throughout the several views, attention is first directed to FIG. 1 which illustrates an electrically powered vehicle generally designated 10. Vehicle 10 includes a body 12 to which wheels 13 are coupled. One or more of wheels 13 is a drive wheel to provide the motive force for moving body 12. Body 12 carries a drive train 14 for driving the drive wheels, at least one of wheels 13. Drive train 14 includes an electric motor 15 which turns a drive shaft 17 at a varying torque and revolutions per minute, and a driver gear 18, an engine wheel 19 and a crankshaft 20 which magnify the torque and transmit this driving force to wheels 13. A portable power source, in this instance a suite of batteries 22, powers electric motor 15.

Still referring to FIG. 1, body 12 includes a forward compartment 23, a passenger compartment 24, and a rear compartment 25. Forward compartment 23 carries the major portions of drive train 14, while rear compartment 25 carries batteries 22. The various compartments have been provided for purposes of illustration, and it will be understood that other distribution of elements has been contemplated, such as reversing the positioning of batteries 22 and drive train 14, or placing both in a single compartment. Furthermore, it will be understood that for purposes of this description body 12 includes a chassis to which the wheels are coupled and many other elements generally included in a passenger vehicle such as an automobile. A detailed description of the elements of the vehicle will not be included as they are well known to those skilled in the art and will be therefore be inclusive in body 12. It will be further understood that while vehicle 10 is an automobile in this specific embodiment, it is anticipated that drive train 14 can be employed to provide motive force to substantially any vehicle such as a truck, a boat, a train etc., each having a body carrying motive means for imparting motion thereto. In the case of the boat, motive means can be a propeller.

Figure 2:
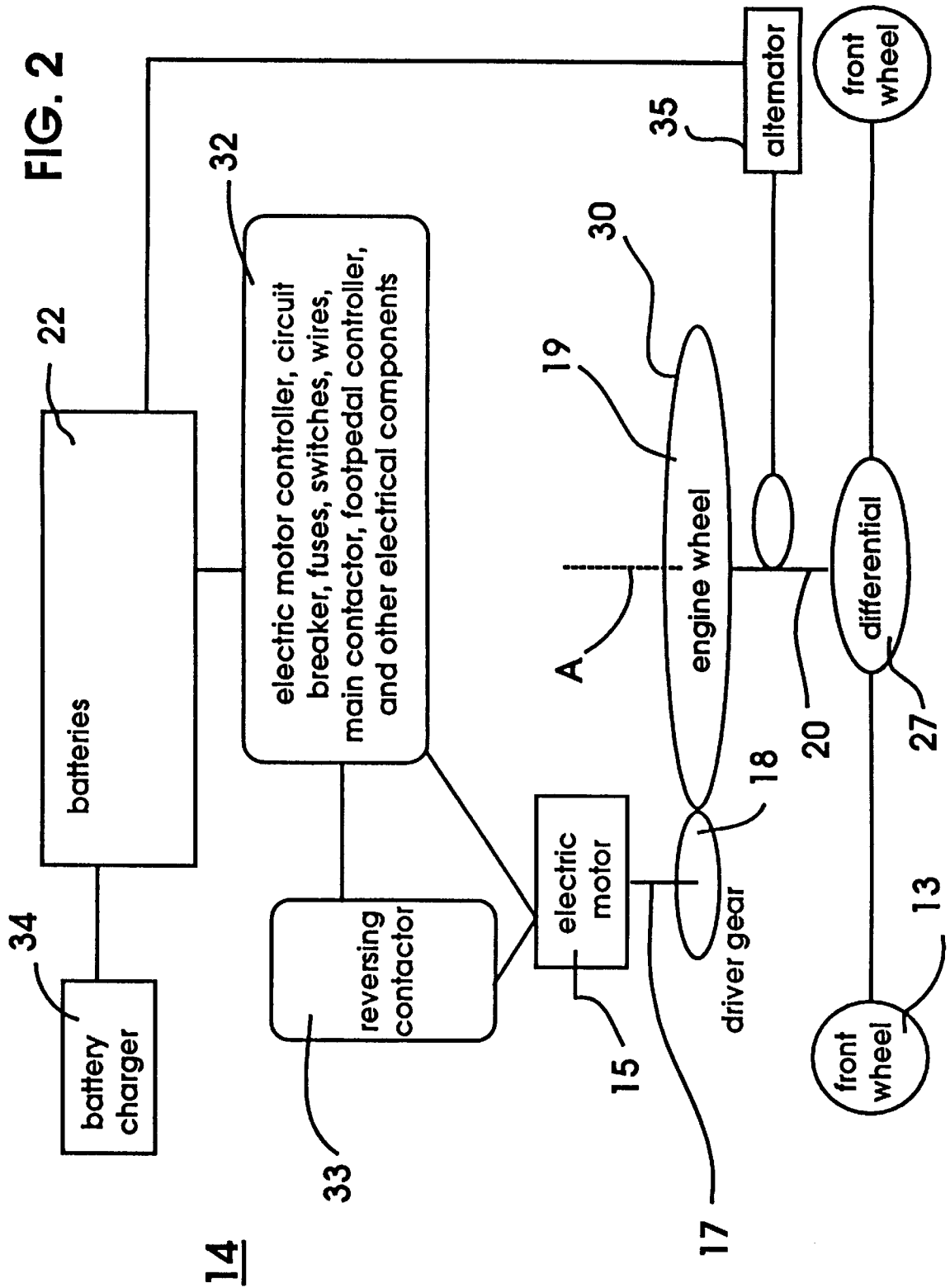
FIG. 2 is a simplified schematic of a drive train in accordance with the teachings of the present invention.

With additional reference to FIG. 2, drive train 14 is illustrated in a simple diagram. Engine wheel 19 is rotated by driver gear 18 which is turned by electric motor 15. Electric motor 15 obtains power from batteries 22. The purpose of this arrangement is to magnify the torque generated by electric motor 15 and applied to wheels 13 of vehicle 10, while maintaining sufficient revolutions per minute to drive the vehicle and passengers at sufficiently high rates of speed. Engine wheel 19 is substantially larger in diameter than driver gear 18, resulting in a magnification of the torque at which motor 15 rotates driver gear 18. The range of ratios is generally 1.5:1 to 10:1 with a preferred ratio of 3:1. However, while magnifying the torque, the RPM's imparted to engine wheel 19 are reduced. At this point in the description, it should be noted that an outer edge of driver gear 18 engages an outer edge of engine wheel 19. The engagement may be accomplished in many different manners, such as by frictional engagement, belts or chains, etc. However, since there will be substantial forces involved, the engagement is preferably by intermeshing of gear teeth formed in the outer edges of driver gear 18 and engine wheel 19.

Engine wheel 19 has a central axis of rotation extending along line A, and an outer edge 30. Crankshaft 20 is fixedly attached to engine wheel 19 at axis of rotation A, to form what is essentially a wheel and axle arrangement. Crankshaft 20 has a diameter which is substantially smaller than the diameter of engine wheel 19. The range of ratio in a vehicle is generally 10:1 to 60:1 with the preferred ratio in an automobile being from 16:1 to 30:1. The reduction in diameters provides a further magnification of force from the force applied to outer edge 30 of engine wheel 19 to crankshaft 20 without a reduction in RPM's. The magnification of the force will vary depending upon the diameter ratio between engine wheel 19 and crankshaft 20.

With additional reference back to FIG. 1, it can be seen that in this specific embodiment engine wheel 19 is horizontally positioned with axis of rotation in a substantially vertical orientation. This permits an engine wheel having a large diameter to be easily positioned in a conventionally sized vehicle, without requiring an inordinate volume of vertical space. Furthermore, the horizontal orientation and vertical crankshaft permit crankshaft 20 to be directly coupled to a differential 27 which imparts the rotation of crankshaft 20 to wheels 13. Drive train 14 is directly coupled to the differential without the need for an intermediately placed transmission, due to the unique magnification of torque.

Control of vehicle 10 is provided to an operator through control assembly 32. Motor 15 has a variable range of horsepower and RPM's dependent upon voltage applied thereto. By coupling batteries 22 to motor 15 through control assembly 32, the voltage applied to motor 15 can be changed to adjust the speed and acceleration of vehicle 10. Typically, control assembly 32 will include current limiters such as circuit breakers and fuses to limit the amps drawn from batteries 22 and a throttle controller which controls the operation of motor 15 by controlling the voltage applied. Also included in the control of vehicle 10 is a reversing contact 33 which is switchable by control assembly 32. Reversing contact 33 switches electric motor 15 between a forward or reverse operation. This permits vehicle 10 to proceed in a forward or reverse direction. Additional description of the control assembly is not included as controlling the output of an electric motor is well known and understood.

A battery charger 34 is included in a conventional manner, for recharging batteries 22 after depletion. This can be any conventional charger. To extend the range of the vehicle, an alternator 35 can be coupled to batteries 22 and in engagement with crankshaft 20. As will be readily determined from this description, much of the torque generated in drive train 14 is not always required and is therefore wasted. To capture some of this wasted torque, alternator 35 is operated by crankshaft 20, providing a charge to batteries 22.

To further illustrate the principles under which drive train 14 operates and to highlight the magnification of force which permits extended operating times over current electric vehicles, an example of a preferred drive train is described below.

EXAMPLE

The electric motor preferred is a series wound direct current motor which is rated at 8 horsepower for continuous run, and which peaks at 35 horsepower. Employing four 12 volt batteries in series provides 48 volts to power the motor. At 48 volts, the motor turns 4000 RPM's as a continuous maximum. While substantially any type of battery may be employed, in this example deep cycle lead acid batteries are used, each having a discharge time of 272 minutes at 75 amps. When operated at 4000 RPM's and generating 5 foot/pounds of torque, the motor will draw 60 amps.

The motor is attached to the driver gear which has a 3:1 ratio with the engine wheel. In this example, the engine wheel is 36 inches in diameter and has 300 teeth about its outer circumference. A 12 inch diameter driver gear having 100 teeth, engages the engine wheel. The crankshaft fixedly attached to the engine wheel, has a diameter of approximately 1.5 inches, a 24:1 ratio with the engine wheel. The magnification of force from the driver gear to the crankshaft is 72 times.

When the motor rotates the driver gear at 4000 RPM's, the engine wheel will rotate at 1333 RPM's. The loss in RPM's is due to the increase in diameter. The increase in diameter also increases the torque by a factor of three. The crankshaft is fixedly attached to the engine wheel, and therefore also rotates at 1333 RPM's. Since the crankshaft has a much reduced diameter and matches RPM's with the engine wheel, the torque is again magnified, in this case by a factor of 24.

At 60 amps and 4000 RPM's the motor generates a torque of 5 foot/pounds. This torque is magnified at the edge of the engine wheel to 15 foot/pounds, and again magnified at the crankshaft to 360 foot/pounds. For a 3800 pound vehicle to reach 90 miles an hour, approximately 318 foot/pounds of torque is required at the drive wheel of the vehicle. This is well exceeded by the 360 ft/lbs generated. To generate greater torque for more acceleration, the motor can draw 100 amps, which at 4000 RPM's generates 11 ft/lbs of torque. This is magnified to 792 ft/lbs of torque at the crankshaft. With the differential set to 1:1, the wheels of the vehicle will rotate at Approximately 800 revolutions per mile. Thus, at 60 MPH the wheels will rotate at approximately 800 revolutions per minute. This means the engine wheel needs to rotate at approximately 800 revolutions per minute for the vehicle to travel at 60 MPH. 1200 revolution/min. of the engine wheel will drive the vehicle approximately 90 MPH. Thus, the 1333 RPM as a very conservative top RPM will drive the vehicle close to 100 MPH. Since the batteries have a 272 minute charge at 75 amps, the vehicle will theoretically travel at 90 MPH for over 272 minutes. This is over 400 miles. This distance and running time will vary depending on the driving conditions, and the acceleration required.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An electric vehicle comprising:

a body;

motive means coupled to the body for moving the body;

a differential carried by the body and coupled to the motive means for imparting motion to the motive means; and a drive train carried by the body, the drive train including:
   an electric motor;
   an engine wheel having a central axis of rotation, an outer edge and a diameter;
   a driver gear driven by the electric motor and engaging the outer edge of the engine wheel for driving the engine wheel, the driver gear having a diameter which is smaller than the diameter of the engine wheel;
   a crank shaft fixedly attached to the engine wheel at the axis of rotation for rotation therewith, and coupled to the differential, the crank shaft having a diameter smaller than the diameter of the engine wheel and wherein the engine wheel is carried above the differential in a horizontal orientation with the crank shaft extending vertically downward and directly coupled to the differential; and
   a portable power source coupled to the electric motor.

2. An electric vehicle as claimed in claim 1 wherein the engine wheel has a diameter at least three times larger than the diameter of the driver gear.

3. An electric vehicle as claimed in claim 2 wherein the engine wheel has a diameter at least 10 times larger than the diameter of the crankshaft.

4. An electric vehicle as claimed in claim 1 wherein the motive means includes a drive wheel coupled to the gear device.

5. An electric vehicle as claimed in claim 1 wherein the body includes a compartment for carrying passengers.

6. An electric vehicle as claimed in claim 1 further including a control assembly for controlling the electric motor.

7. An electric vehicle as claimed in claim 6 wherein the control assembly includes a current limiter to limit the amps drawn from the portable power source and a throttle controller which controls the operation of the motor by controlling the voltage applied thereto.

8. An electric vehicle as claimed in claim 6 further including a battery charger coupled to the portable power source.

9. An electric vehicle as claimed in claim 6 further including an alternator coupled to the portable power source and engaging the crankshaft.

\* \* \* \* \*